United States Patent
Zhang et al.

(10) Patent No.: US 11,178,588 B2
(45) Date of Patent: Nov. 16, 2021

(54) MEASUREMENT METHOD AND APPARATUS

(71) Applicant: Huawei Technologies Co., Ltd., Shenzhen (CN)

(72) Inventors: Hongping Zhang, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 9 days.

(21) Appl. No.: 16/832,236

(22) Filed: Mar. 27, 2020

(65) Prior Publication Data
US 2020/0229052 A1 Jul. 16, 2020

Related U.S. Application Data

(63) Continuation of application No. PCT/CN2018/106037, filed on Sep. 17, 2018.

(30) Foreign Application Priority Data

Sep. 28, 2017 (CN) .......................... 201710900295.1

(51) Int. Cl.
*H04W 36/00* (2009.01)
*H04B 17/318* (2015.01)
(Continued)

(52) U.S. Cl.
CPC ...... *H04W 36/0088* (2013.01); *H04B 17/318* (2015.01); *H04L 5/0048* (2013.01);
(Continued)

(58) Field of Classification Search
CPC . H04W 36/0088; H04W 76/15; H04W 24/10; H04W 36/30; H04W 24/08; H04B 17/318; H04L 5/0048
(Continued)

(56) References Cited

U.S. PATENT DOCUMENTS

| 2011/0281578 A1 | 11/2011 | Narasimha et al. |
| 2012/0003943 A1* | 1/2012 | Marinier ............... H04W 24/10 455/73 |
| 2015/0223125 A1 | 8/2015 | Lu et al. |

FOREIGN PATENT DOCUMENTS

| CN | 101674586 A | 3/2010 |
| CN | 101827369 A | 9/2010 |

(Continued)

OTHER PUBLICATIONS

ZTE, "Consideration on the measurement coordination in LTE/NR tight interworking", 3GPP TSG-RAN WG2 Meeting R2-1708138, ZTE, Aug. 21-25, 2017, 7 pages, Berlin, Germany.
(Continued)

*Primary Examiner* — Marcos Batista
(74) *Attorney, Agent, or Firm* — Slater Matsil, LLP

(57) ABSTRACT

This application provides a measurement method and an apparatus. The method includes: receiving a measurement configuration from a base station, where the measurement configuration includes indication information, and the indication information is used to indicate a relationship between neighboring cell measurement of a terminal and configured s-measure of the terminal. In the method, the indication information may be carried in the measurement configuration, and the indication information indicates the relationship between the neighboring cell measurement of the terminal and configured s-measure of the terminal.

20 Claims, 6 Drawing Sheets

(51) Int. Cl.
   *H04W 76/15* (2018.01)
   *H04L 5/00* (2006.01)
   *H04W 24/10* (2009.01)
   *H04W 36/30* (2009.01)

(52) U.S. Cl.
   CPC ........... *H04W 24/10* (2013.01); *H04W 36/30* (2013.01); *H04W 76/15* (2018.02)

(58) Field of Classification Search
   USPC .................................. 455/436–437; 370/338
   See application file for complete search history.

(56) References Cited

FOREIGN PATENT DOCUMENTS

| | | |
|---|---|---|
| CN | 102014422 A | 4/2011 |
| CN | 102186188 A | 9/2011 |
| CN | 102281552 A | 12/2011 |
| CN | 102281556 A | 12/2011 |
| EP | 2809090 A1 | 12/2014 |
| WO | 2019028908 A1 | 2/2019 |
| WO | 2019242722 A1 | 12/2019 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2(Release 15)", 3GPP TS 37.340 V1.0.0 (Sep. 2017), 44 pages.

Intel, "AdHoc minutes for NR RRM", 3GPP TSG-RAN WG4 Meeting #84, R4-1709086, Aug. 21-25, 2017, 26 pages, Berlin, Germany.

"3rd Generation Partnership Project;Technical Specification Group Radio Access Network; NR; Radio Resource Control (RRC); Protocol specification (Release 15)", 3GPP TS 38.331 V0.0.5 (Aug. 2017), 38 pages.

Ericsson, "s-Measure and its impact on cell level and beam level measurements in NR", 3GPP TSG-RAN WG2 #99, Tdoc R2-1708578, Aug. 21-25, 2017, 6 pages, Berlin, Germany.

Samsung, "Discussion on s-Measure Considering NR-SS and CSI-RS", 3GPP TSG RAN WG2 AH NR, R2-1707329, Jun. 27-29, 2017, 5 pages, Qingdao, China.

* cited by examiner

MEASUREMENT METHOD AND APPARATUS

CROSS-REFERENCE TO RELATED APPLICATIONS

This application is a continuation of International Application No. PCT/CN2018/106037, filed on Sep. 17, 2018, which claims priority to Chinese Patent Application No. 201710900295.1, filed on Sep. 28, 2017. The disclosures of the aforementioned applications are hereby incorporated by reference in their entireties.

TECHNICAL FIELD

This application relates to the field of mobile communications technologies, and in particular, to a measurement method and an apparatus.

BACKGROUND

In a mobile communications system, a network transmits a measurement configuration; user equipment (UE) performs measurement based on the measurement configuration, and determines whether reporting of a measurement report needs to be triggered; and if yes, the user equipment reports the measurement report to the network, and the network performs mobility decision, carrier management, or the like based on the measurement report.

In a long term evolution (LTE) standard, when a primary cell (PCell) signal quality of UE is higher than s-measure, it indicates that a serving cell signal is sufficiently strong. In this case, the UE may continue to perform serving cell measurement, but stop performing measurement on intra-frequency, inter-frequency, and inter-RAT neighboring cells, to save power for the UE.

SUMMARY

This application provides a measurement method and an apparatus, to flexibly configure a measurement configuration of a terminal, thereby further implementing balance between power saving and performance of UE.

According to a first aspect, this application provides a measurement method, and the method may be performed by a terminal or a chip in a terminal. The method includes: receiving a measurement configuration from a base station, where the measurement configuration includes indication information, the indication information is used to indicate a relationship between neighboring cell measurement of a terminal and configured s-measure of the terminal, and s-measure is used by the terminal to perform no neighboring cell measurement when signal quality of a primary cell is higher than or equal to s-measure; and performing the neighboring cell measurement based on the indication information. In the method, the indication information is carried in the measurement configuration, to indicate the relationship between the neighboring cell measurement of the terminal and configured s-measure of the terminal, so that the terminal can perform the neighboring cell measurement based on the indication information. In the method, the indication information may be carried in the measurement configuration, and the indication information indicates the relationship between the neighboring cell measurement of the terminal and configured s-measure of the terminal, so that flexible configuration of the measurement configuration is implemented.

In a possible design, that the indication information is used to indicate a relationship between neighboring cell measurement of a terminal and configured s-measure of the terminal includes: the indication information indicates ignoring s-measure during the neighboring cell measurement; and the performing the neighboring cell measurement based on the indication information includes: performing the neighboring cell measurement when the signal quality of the primary cell in which the base station provides a service to the terminal is higher than s-measure, where the base station includes a primary base station or a secondary base station. In the method, the indication information may indicate ignoring s-measure during the neighboring cell measurement of the terminal.

In a possible design, that the indication information indicates ignoring s-measure during the neighboring cell measurement of the terminal includes: the indication information indicates ignoring s-measure during inter-RAT radio access technology inter-RAT measurement of the terminal; and the performing the neighboring cell measurement when the signal quality of the primary cell in which the base station provides a service to the terminal is higher than s-measure includes: performing the inter-RAT measurement of the terminal when the signal quality of the primary cell in which the base station provides a service to the terminal is higher than s-measure. In this method, the indication information may indicate ignoring s-measure during the inter-RAT measurement of the terminal. Therefore, when the signal quality of the primary cell in which the base station provides a service to the terminal is higher than s-measure, the terminal performs only a part of the neighboring cell measurement, that is, performs only the inter-RAT measurement, thereby achieving balance between UE power saving and UE performance.

In a possible design, the measurement configuration carries a report configuration, the report configuration carries the indication information, and the indication information is used to indicate ignoring s-measure during neighboring cell measurement of a measurement task associated with the report configuration; or the measurement configuration carries a measurement object configuration, the measurement object configuration carries the indication information, and the indication information is used to indicate ignoring s-measure during neighboring cell measurement of a measurement task associated with the measurement object configuration; or the measurement configuration carries a measurement identification (ID) configuration, the measurement ID configuration carries the indication information, and the indication information is used to indicate ignoring s-measure during neighboring cell measurement of a measurement task associated with the measurement ID configuration. In the method, the indication information may be carried in the report configuration of the measurement configuration, or carried in the measurement object configuration of the measurement configuration, or carried in the measurement ID configuration of the measurement configuration. Different methods for carrying the indication information may enable the indication information to indicate ignoring s-measure during neighboring cell measurement of different measurement tasks. During specific implementation, the indication information may be flexibly configured based on a specific requirement.

In a possible design, that the indication information is used to indicate a relationship between neighboring cell measurement of a terminal and configured s-measure of the terminal includes: the indication information indicates that s-measure cannot be ignored during the neighboring cell measurement of the terminal. The performing the neighboring cell measurement based on the indication information includes: stopping performing the neighboring cell measurement, when the signal quality of the primary cell in which the base station provides a service to the terminal is higher than s-measure, where the base station includes a primary base station or a secondary base station.

In a possible design, s-measure is a reference signal received power (RSRP) threshold or a signal or interference plus noise ratio (SINR) threshold configured by the base station.

In a possible design, s-measure is an RSRP threshold that is based on synchronization signal block SS block measurement; or s-measure is an RSRP threshold that is based on channel state information-reference signal (CSI-RS) measurement; or s-measure is an SINR threshold that is based on SS block measurement; or s-measure is an SINR threshold that is based on CSI-RS measurement.

In a possible design, the indication information is a reference threshold, and the reference threshold is greater than s-measure; and the performing the neighboring cell measurement based on the indication information includes: performing the neighboring cell measurement when the signal quality of the primary cell in which the base station provides a service to the terminal is higher than s-measure and is lower than the reference threshold; or stopping performing the neighboring cell measurement when the signal quality of the primary cell in which the base station provides a service to the terminal is higher than the reference threshold, where the base station includes the primary base station or the secondary base station.

In a possible design, the indication information is an offset value, and the offset value is greater than 0; and the performing the neighboring cell measurement based on the indication information includes: performing, by the terminal, the neighboring cell measurement when the signal quality of the primary cell in which the base station provides a service to the terminal is higher than s-measure and is lower than a sum of s-measure and the offset value; or stopping performing, by the terminal, the neighboring cell measurement when the signal quality of the primary cell in which the base station provides a service to the terminal is higher than the sum of s-measure and the offset value, where the base station includes the primary base station or the secondary base station.

In a possible design, the base station is the primary base station of the terminal, the indication information is used to indicate a relationship, configured by the primary base station, between the neighboring cell measurement of the terminal and configured s-measure of the terminal, and s-measure is sent by the primary base station of the terminal to the terminal; or the base station is the secondary base station of the terminal, the indication information is used to indicate a relationship, configured by the secondary base station, between the neighboring cell measurement of the terminal and configured s-measure of the terminal, and s-measure is sent by the secondary base station of the terminal to the terminal.

According to a second aspect, this application provides a measurement method, and the method may be performed by a base station or a chip in a base station. The method includes: generating a measurement configuration, where the measurement configuration includes indication information, the indication information is used to indicate a relationship between neighboring cell measurement of a terminal and configured s-measure of the terminal, and s-measure is used by the terminal to perform no neighboring cell measurement when signal quality of a primary cell is higher than or equal to s-measure; and sending the measurement configuration to the terminal.

In a possible design, that the indication information is used to indicate a relationship between neighboring cell measurement of a terminal and configured s-measure of the terminal includes: the indication information indicates ignoring s-measure during the neighboring cell measurement.

In a possible design, that the indication information indicates ignoring s-measure during the neighboring cell measurement of the terminal includes: the indication information indicates ignoring s-measure during inter-RAT measurement of the terminal.

In a possible design, the measurement configuration carries a report configuration, the report configuration carries the indication information, and the indication information is used to indicate ignoring s-measure during neighboring cell measurement of a measurement task associated with the report configuration; or the measurement configuration carries a measurement object configuration, the measurement object configuration carries the indication information, and the indication information is used to indicate ignoring s-measure during neighboring cell measurement of a measurement task associated with the measurement object configuration; or the measurement configuration carries a measurement identification (ID) configuration, the measurement ID configuration carries the indication information, and the indication information is used to indicate ignoring s-measure during neighboring cell measurement of a measurement task associated with the measurement ID configuration.

In a possible design, that the indication information is used to indicate a relationship between neighboring cell measurement of a terminal and configured s-measure of the terminal includes: the indication information indicates that s-measure cannot be ignored during the neighboring cell measurement of the terminal.

In a possible design, s-measure is a reference signal received power (RSRP) threshold or a signal to interference plus noise ratio (SINR) threshold configured by the base station.

In a possible design, s-measure is an RSRP threshold that is based on synchronization signal block SS block measurement; or s-measure is an RSRP threshold that is based on channel state information-reference signal (CSI-RS) measurement; or s-measure is an SINR threshold that is based on SS block measurement; or s-measure is an SINR threshold that is based on CSI-RS measurement.

In a possible design, that the indication information is used to indicate a relationship, configured by a primary base station, between the neighboring cell measurement of the terminal and configured s-measure of the terminal; or the indication information is used to indicate a relationship, configured by a secondary base station, between the neighboring cell measurement of the terminal and configured s-measure of the terminal.

According to a third aspect, this application provides an apparatus. The apparatus may be a terminal or a chip in a terminal. The apparatus has functions of implementing various embodiments according to the first aspect. The functions may be implemented by hardware, or may be implemented by hardware executing corresponding software. The hardware or the software includes one or more modules corresponding to the foregoing functions.

In a possible design, when the apparatus is a terminal, the terminal includes a processing unit and a communications unit. The processing unit may be, for example, a processor.

The communications unit may be, for example, a transceiver, and the transceiver includes a radio frequency circuit. Optionally, the terminal further includes a storage unit, and the storage unit may be, for example, a memory. When the terminal includes the storage unit, the storage unit stores a computer-executable instruction. The processing unit is connected to the storage unit. The processing unit executes the computer-executable instruction stored in the storage unit, so that the terminal performs any measurement method according to the first aspect.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that any measurement method according to the first aspect is performed. Optionally, the storage unit is a storage unit in the chip, for example, a register or a buffer, and the storage unit may alternatively be a storage unit that is in the terminal and that is outside the chip, for example, a read-only memory (ROM), another type of static storage device that can store static information and an instruction, or a random access memory (RAM).

Any processor mentioned above may be a general-purpose central processing unit (CPU), a microprocessor, an application-specific integrated circuit (ASIC), or one or more integrated circuits for controlling program execution of the measurement method according to the first aspect.

According to a fourth aspect, this application provides an apparatus. The apparatus may be a base station or a chip in a base station. The apparatus has functions of implementing various embodiments according to the second aspect. The functions may be implemented by hardware, or may be implemented by hardware executing corresponding software. The hardware or the software includes one or more modules corresponding to the foregoing functions.

In a possible design, when the apparatus is a base station, the base station includes a processing unit and a communications unit. The processing unit may be, for example, a processor. The communications unit may be, for example, a transceiver, and the transceiver includes a radio frequency circuit. Optionally, the base station further includes a storage unit, and the storage unit may be, for example, a memory. When the base station includes a storage unit, the storage unit stores a computer-executable instruction. The processing unit is connected to the storage unit. The processing unit executes the computer-executable instruction stored in the storage unit, so that the base station performs any measurement method according to the second aspect.

In another possible design, when the apparatus is a chip in a base station, the chip includes a processing unit and a communications unit. The processing unit may be, for example, a processor. The communications unit may be, for example, an input/output interface, a pin, or a circuit. The processing unit may execute a computer-executable instruction stored in a storage unit, so that any measurement method according to the second aspect is performed. Optionally, the storage unit is a storage unit in the chip, for example, a register or a buffer, and the storage unit may alternatively be a storage unit that is in the base station and that is outside the chip, for example, a ROM, another type of static storage device that can store static information and an instruction, or a RAM.

Any processor mentioned above may be a general-purpose CPU, a microprocessor, an ASIC, or one or more integrated circuits for controlling program execution of the measurement method according to the second aspect.

According to a fifth aspect, this application further provides a computer-readable storage medium. The computer-readable storage medium stores an instruction. When the instruction is run on a computer, the computer is enabled to perform the methods according to the foregoing aspects.

According to a sixth aspect, this application further provides a computer program product that includes an instruction. When the computer program product is run on a computer, the computer is enabled to perform the methods according to the foregoing aspects.

In addition, for technical effects brought by any design manner of the second aspect to the sixth aspect, refer to technical effects brought by different design manners according to the first aspect. Details are not described herein again.

These aspects or other aspects in this application may be clearer and more intelligible in description in the following embodiments.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in method embodiments may also be applied to an apparatus embodiment or a system embodiment. In the description of this application, unless otherwise specified, "a plurality of" means at least two.

It should be noted that a measurement method in this application relates to a first communications apparatus and a second communications apparatus. The first communications apparatus may be a base station or a chip in a base station, that is, the base station or the chip in the base station may perform the measurement method implemented by the first communications apparatus in the embodiments of this application. The second communications apparatus may be a terminal or a chip in a terminal, that is, the terminal or the chip in the terminal may perform the measurement method implemented by the second communications apparatus in the embodiments of this application.

For ease of description, in this application, the measurement method is described by using an example in which the first communications apparatus is a base station and the second communications apparatus is a terminal. For an implementation method in which the first communications apparatus is a chip in a base station and the second communications apparatus is a chip in a terminal, refer to specific description of the measurement method of the base station or the terminal. Details are not described again.

Figure 1:
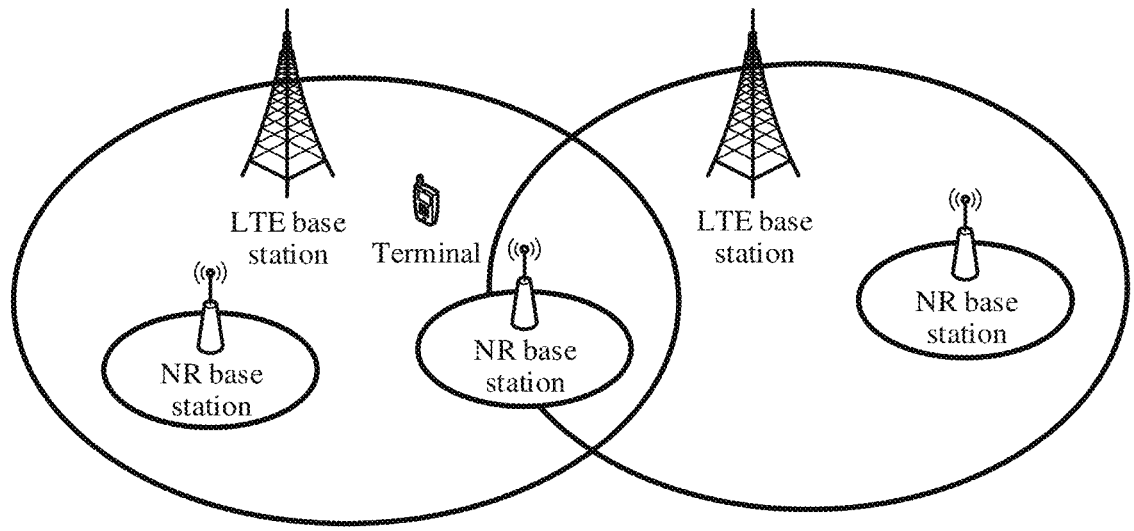
FIG. 1 is a schematic diagram of a possible network architecture according to an embodiment of this application.

FIG. 1 is a schematic diagram of a possible network architecture according to an embodiment of this application. The architecture shown in FIG. 1 includes a plurality of base stations and at least one terminal. The terminal may simultaneously access an LTE base station and an NR base station. The LTE base station may be used as a primary base station, and a primary cell in the LTE base station is used as a primary cell (PCell) of the terminal. The NR base station is used as a secondary base station, and a primary cell in the NR base station is used as a primary secondary cell (PSCell) of the terminal. It may also be understood that a primary cell that is in the primary base station and that provides a service to the terminal is referred to as the primary cell (PCell) of the terminal. A primary cell that is in the secondary base station and that provides a service to the terminal is referred to as the primary secondary cell (PSCell) of the terminal.

The terminal in this application is a device having a wireless sending and receiving function. The terminal may be deployed on the land, including an indoor device, an outdoor device, a handheld device, or a vehicle-mounted device; may be deployed on the water (for example, in a steamship); or may be deployed in the air (for example, on an airplane, a balloon, and a satellite). The terminal may be a mobile phone, a tablet computer (pad), a computer with a wireless sending and receiving function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The base station in this application is a device that connects a terminal to a wireless network. The base station includes but is not limited to: a gNodeB (gNB), an evolved NodeB (eNB), a NodeB (NB), a base station controller (BSC), a base transceiver station (BTS), a home evolved NodeB (for example, a home evolved nodeB or a home nodeB, HNB), a baseband unit (BBU), a transmission reception point (transmitting and receiving point, TRP), a transmission point (transmitting point, TP), a mobile switching center, and the like in 5G.

With development of a mobile communications system, carrier aggregation (CA) is introduced. The carrier aggregation means that UE can simultaneously use a plurality of cells (carriers) to perform uplink and downlink communication, to support high-speed data transmission. Among the plurality of cells, one is a primary cell (PCell), and another is a secondary cell (SCell).

Based on the carrier aggregation, cell aggregation between two base stations is further introduced, and is referred to as dual connectivity (DC). That is, the carrier aggregation is supported for a plurality of cells served by the two base stations, so that a user can have better user experience. For UE, one cell is a master eNodeB (Master eNB, MeNB), and another cell is a secondary eNodeBs (Secondary eNB, SeNB). In addition, a base station in which the PCell is located is a primary base station, and the primary base station undertakes more control functions. A serving cell served by a secondary base station has a primary secondary cell (PSCell), and another serving cell is an SCell.

A measurement configuration transmitted by the base station to the terminal usually includes: a measurement object configuration (measObjectConfig), a report configuration (reportConfig), and a measurement identification (ID) configuration (measIDConfig).

The measurement object configuration mainly includes a measurement object, and the measurement object mainly includes a frequency of a to-be-measured cell, a configuration related to generation of a cell measurement value, and the like.

The report configuration includes a measurement event and a configuration related to triggering of a measurement report, and the like. For example, a configuration measurement event A3 indicates that quality of service of a neighboring cell is one offset value higher than that of a serving cell.

The measurement ID configuration corresponds to the measurement object and the report configuration. That is, the measurement object and the report configuration are combined to generate a measurement task. It may also be understood that one measurement ID corresponds to one measurement task.

The following provides an example for description with reference to a specific example.

For example, the measurement configuration transmitted by the base station to the terminal is:

```
{
    Measurement ID configuration 1 {MeasID 1 (reportConfig ID 1, objectID 1)}
    Measurement ID configuration 2 {MeasID 2 (reportConfig ID 1, objectID 2)}
    Measurement ID configuration 3 {MeasID 3 (reportConfig ID 2, objectID 1)}
    Measurement ID configuration 4 {MeasID 4 (reportConfig ID 2, objectID 2)}
    Measurement ID configuration 5 {MeasID 5 (reportConfig ID 3, objectID 1)}
    Measurement ID configuration 6 {MeasID 6 (reportConfig ID 3, objectID 2)}
    Measurement object configuration 1 {objectID 1 (f1)}
    Measurement object configuration 2 {objectID 1 (f2)}
    Report configuration 1 {reportConfig ID 1 (A1)}
    Report configuration 2 {reportConfig ID 2 (B1)}
    Report configuration 3 {reportConfig ID 3 (A1)}
    s-measure
}
```

The foregoing measurement configuration includes two measurement object configurations that are respectively represented by objectID 1 and objectID 2, and respectively correspond to measured frequencies f1 and f2. The measurement configuration includes three report configurations that are respectively represented by reportConfig ID 1 to reportConfig ID 3, and respectively correspond to measurement events A1, B1, and A1. The measurement configuration further includes six measurement ID configurations that are respectively represented by MeasID 1 to MeasID 6, and respectively correspond to six measurement tasks. Each measurement task corresponds to one measurement object and one measurement event. For details, refer to the foregoing description. Further, the measurement configuration further includes configured s-measure.

The quality threshold s-measure is introduced mainly for saving power of the UE, s-measure is a threshold configured by a network, and s-measure is used by the terminal to perform no neighboring cell measurement when signal quality of a primary cell is higher than or equal to s-measure.

When the base station is a primary base station, the primary cell is a primary cell (PCell) of the primary base station. When the base station is a secondary base station, the primary cell is a primary secondary cell (PSCell) of the secondary base station. In the prior art, when PCell signal quality of a terminal is higher than or equal to s-measure, the terminal does not perform measurement on any intra-frequency, inter-frequency, and inter-RAT system neighboring cell. However, this measurement method has some problems. For example, as shown in FIG. 1, in an EN-DC scenario, according to the prior art, when PCell signal quality of an LTE base station accessed by a terminal is higher than or equal to s-measure, the terminal does not perform measurement on any inter-frequency system and inter-RAT system neighboring cell, so that the terminal does not report a measurement report of an NR cell. The LTE base station does not receive the measurement report of the NR cell reported by the terminal, in this way, the LTE base station cannot add a cell of an NR base station. In other words, the NR base station cannot be used as a secondary base station. Consequently, the UE cannot use the NR cell, reducing performance of the UE.

Figure 2:
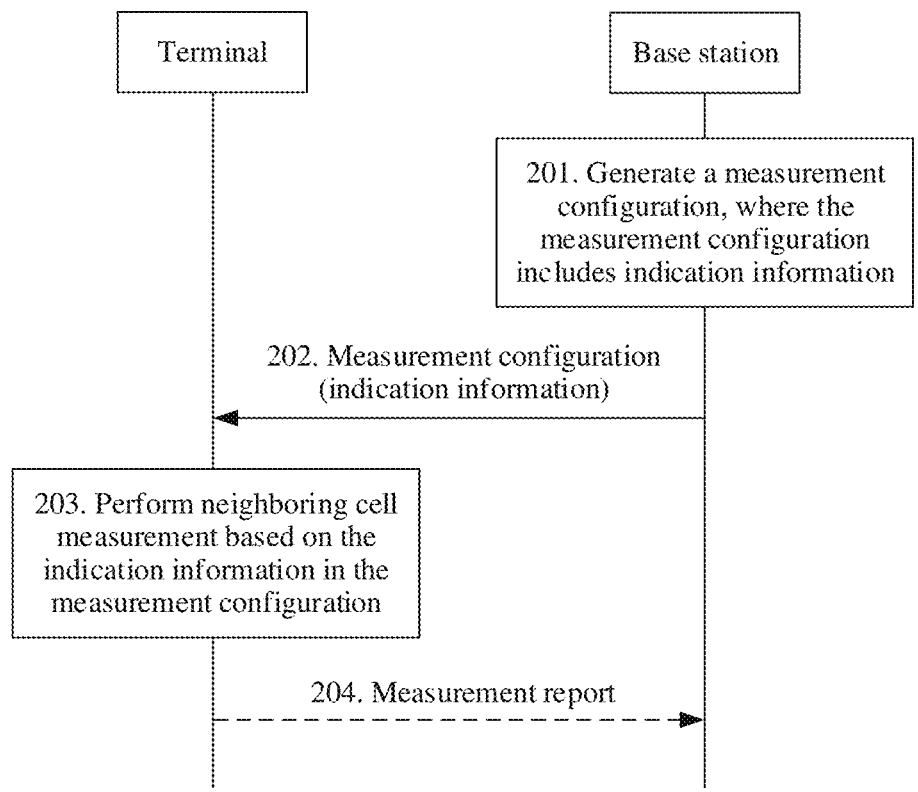
FIG. 2 is a schematic diagram of a measurement method according to an embodiment of this application.

To resolve the foregoing problems, as shown in FIG. 2, embodiments of this application provide a measurement method. On a terminal side, the method may be performed by a terminal or a chip of a terminal, and on a base station side, may be performed by a base station or a chip of a base station. The following embodiment is described by using interaction between a base station and a terminal as an example.

It should be noted that the measurement method in this application may be applicable to an application scenario in which EN-DC is configured, but is not limited thereto. For example, the measurement method in this application may alternatively be applicable to carrier management inside an NR system. The method includes the following steps.

Step 201. The base station generates a measurement configuration.

The measurement configuration generated by the base station includes a measurement object configuration, a report configuration, and a measurement ID configuration. For details, refer to the foregoing description. The measurement configuration further includes s-measure.

Further, in this application, the measurement configuration further includes indication information, and the indication information is used to indicate a relationship between neighboring cell measurement of the terminal and configured s-measure of the terminal.

Specifically, the relationship that is between the neighboring cell measurement of the terminal and configured s-measure of the terminal and that is indicated by the indication information may be understood as whether the neighboring cell measurement of the terminal is related to configured s-measure of the terminal, or may be understood as whether configured s-measure of the terminal can be ignored during the neighboring cell measurement of the terminal.

The following describes different cases.

Case 1. The indication information indicates ignoring s-measure during the neighboring cell measurement of the terminal That the indication information indicates ignoring s-measure during the neighboring cell measurement may also be understood as that whether the terminal performs the neighboring cell measurement is not related to s-measure. In other words, no matter whether quality of a PCell measured by the terminal is higher than, lower than, or equal to s-measure, the neighboring cell measurement performed by the terminal is not affected.

Case 2. The indication information indicates that s-measure cannot be ignored during the neighboring cell measurement of the terminal That the indication information indicates that s-measure cannot be ignored during the neighboring cell measurement may also be understood as that whether the terminal performs the neighboring cell measurement is related to s-measure. For example, in an implementation, when signal quality of the PCell measured by the terminal is higher than s-measure, the terminal may stop performing the neighboring cell measurement.

Step 202. The base station sends the measurement configuration to the terminal, and the terminal receives the measurement configuration from the base station.

Optionally, when the terminal is in a radio resource control (RRC) connected mode, the base station sends the measurement configuration to the terminal. It should be noted herein that the measurement object configuration, the report configuration, the measurement ID configuration, s-measure, and the indication information that are included in the measurement configuration are not limited to being sent to the terminal in one RRC message, and may alternatively be sent to the terminal in a plurality of RRC messages in sequence.

Step 203. The terminal performs the neighboring cell measurement based on the indication information in the measurement configuration.

After receiving the measurement configuration, the terminal obtains a measurement ID in the measurement configuration, and one measurement ID corresponds to one measurement task. The terminal further obtains the indication information in the measurement configuration, and the indication information may indicate that the terminal performs the neighboring cell measurement for some or all of the measurement tasks based on the indication information.

For the foregoing case 1, when the indication information indicates ignoring s-measure during the neighboring cell measurement of the terminal, specifically, measurement tasks, in the measurement configuration, for which the neighboring cell measurement is performed based on the indication information is related to a manner in which the measurement configuration carries the indication information. The following describes several implementation methods.

Implementation method 1: The measurement configuration carries the report configuration, and the report configuration carries the indication information.

In the implementation method 1, the indication information is used to indicate ignoring s-measure during the neighboring cell measurement of the measurement task associated with the report configuration.

Based on the foregoing example of the measurement configuration, in the implementation method 1, the indication information may be carried in the report configuration, for example, the indication information is carried in a report configuration 1, that is, the measurement configuration may be shown as follows:

{
  Measurement ID configuration 1 {MeasID 1 (reportConfig ID 1, objectID 1)}

-continued

```
    Measurement ID configuration 2 {MeasID 2 (reportConfig ID 1,
objectID 2)}
    Measurement ID configuration 3 {MeasID 3 (reportConfig ID 2,
objectID 1)}
    Measurement ID configuration 4 {MeasID 4 (reportConfig ID 2,
objectID 2)}
    Measurement ID configuration 5 {MeasID 5 (reportConfig ID 3,
objectID 1)}
    Measurement ID configuration 6 {MeasID 6 (reportConfig ID 3,
objectID 2)}
    Measurement object configuration 1 {objectID 1 (f1)}
    Measurement object configuration 2 {objectID 1 (f2)}
    Report configuration 1 {reportConfig ID 1 (A1), indication
information}
    Report configuration 2 {reportConfig ID 2 (B1)}
    Report configuration 3 {reportConfig ID 3 (A1)}
    s-measure
}
```

Because the measurement ID configuration 1 and the measurement ID configuration 2 include the reportConfig ID 1, the measurement task associated with the report configuration 1 is the measurement ID configuration 1 and the measurement ID configuration 2. Therefore, when the indication information is carried in the report configuration 1, the indication information indicates that a measurement task corresponding to the measurement ID configuration 1 and a measurement task corresponding to the measurement ID configuration 2 ignore s-measure during the neighboring cell measurement.

Implementation method 2: The measurement configuration carries the measurement object configuration, and the measurement object configuration carries the indication information.

In the implementation method 2, the indication information is used to indicate ignoring s-measure during the neighboring cell measurement of the measurement task associated with the measurement object configuration.

Based on the foregoing example of the measurement configuration, in the implementation method 2, the indication information may be carried in the measurement object configuration, for example, the indication information is carried in a measurement object configuration 1, that is, the measurement configuration may be shown as follows:

```
{
    Measurement ID configuration 1 {MeasID 1 (reportConfig ID 1,
objectID 1)}
    Measurement ID configuration 2 {MeasID 2 (reportConfig ID 1,
objectID 2)}
    Measurement ID configuration 3 {MeasID 3 (reportConfig ID 2,
objectID 1)}
    Measurement ID configuration 4 {MeasID 4 (reportConfig ID 2,
objectID 2)}
    Measurement ID configuration 5 {MeasID 5 (reportConfig ID 3,
objectID 1)}
    Measurement ID configuration 6 {MeasID 6 (reportConfig ID 3,
objectID 2)}
    Measurement object configuration 1{objectID 1 (f1), indication
information}
    Measurement object configuration 2 {objectID 1 (f2)}
    Report configuration 1 {reportConfig ID 1 (A1)}
    Report configuration 2 {reportConfig ID 2 (B1)}
    Report configuration 3 {reportConfig ID 3 (A1)}
    s-measure
}
```

Because the measurement ID configuration 1 and the measurement ID configuration 3 include the objectID 1, the measurement task associated with the measurement object configuration 1 is the measurement ID configuration 1 and the measurement ID configuration 3. Therefore, when the indication information is carried in the measurement object configuration 1, the indication information indicates that a measurement task corresponding to the measurement ID configuration 1 and a measurement task corresponding to the measurement ID configuration 3 ignore s-measure during the neighboring cell measurement.

Implementation method 3: The measurement configuration carries the measurement identification ID configuration, and the measurement ID configuration carries the indication information.

In the implementation method 3, the indication information is used to indicate ignoring s-measure during the neighboring cell measurement of the measurement task associated with the measurement ID configuration.

Based on the foregoing example of the measurement configuration, in the implementation method 3, the indication information may be carried in the measurement ID configuration, for example, the indication information is carried in a measurement ID configuration 1, that is, the measurement configuration may be shown as follows:

```
{
    Measurement ID configuration 1 {MeasID 1 (reportConfig ID 1,
objectID 1), indication information}
    Measurement ID configuration 2 {MeasID 2 (reportConfig ID 1,
objectID 2)}
    Measurement ID configuration 3 {MeasID 3 (reportConfig ID 2,
objectID 1)}
    Measurement ID configuration 4 {MeasID 4 (reportConfig ID 2,
objectID 2)}
    Measurement ID configuration 5 {MeasID 5 (reportConfig ID 3,
objectID 1)}
    Measurement ID configuration 6 {MeasID 6 (reportConfig ID 3,
objectID 2)}
    Measurement object configuration 1 {objectID 1 (f1)}
    Measurement object configuration 2 {objectID 1 (f2)}
    Report configuration 1 {reportConfig ID 1 (A1)}
    Report configuration 2 {reportConfig ID 2 (B1)}
    Report configuration 3 {reportConfig ID 3 (A1)}
    s-measure
}
```

Because the indication information is carried in a specific measurement ID configuration, that is, the measurement ID configuration 1, the indication information indicates that a measurement task corresponding to the measurement ID configuration 1 ignores s-measure during the neighboring cell measurement.

Implementation method 4: The measurement configuration carries the indication information, and the indication information is not in the report configuration, the measurement object configuration, and the measurement identification ID configuration.

In the implementation method 4, the indication information is used to indicate ignoring s-measure during the neighboring cell measurement of specific measurement tasks of the terminal. These specific measurement tasks may be specified in a standard protocol, and do not need to be indicated by using RRC signaling. For example, the protocol specifies that a specific measurement task is inter-RAT (inter Radio Access Technology) measurement.

Based on the foregoing example of the measurement configuration, in the implementation method 4, the indication information may be carried in the measurement configuration, and the measurement configuration may be shown as follows:

```
{
    Measurement ID configuration 1 {MeasID 1 (reportConfig ID 1, objectID 1)}
    Measurement ID configuration 2 {MeasID 2 (reportConfig ID 1, objectID 2)}
    Measurement ID configuration 3 {MeasID 3 (reportConfig ID 2, objectID 1)}
    Measurement ID configuration 4 {MeasID 4 (reportConfig ID 2, objectID 2)}
    Measurement ID configuration 5 {MeasID 5 (reportConfig ID 3, objectID 1)}
    Measurement ID configuration 6 {MeasID 6 (reportConfig ID 3, objectID 2)}
        Measurement object configuration 1 {objectID 1 (f1)}
        Measurement object configuration 2 {objectID 1 (f2)}
        Report configuration 1 {reportConfig ID 1 (A1)}
        Report configuration 2 {reportConfig ID 2 (B1)}
        Report configuration 3 {reportConfig ID 3 (A1)}
        s-measure
        Indication information
}
```

Because the indication information is carried in the measurement configuration, and is not in the report configuration, the measurement object configuration, and the measurement identification ID configuration, in this implementation method, the indication information is associated with a specific measurement task of the terminal. That is, for example, when the protocol specifies that the specific measurement task is inter-RAT measurement, the indication information indicates that a measurement task associated with the report configuration 2, that is, the measurement ID configuration 3 and measurement ID configuration 4 ignore s-measure during the neighboring cell measurement.

When the indication information is used to indicate ignoring s-measure during the inter-RAT measurement of the terminal, a manner of performing the neighboring cell measurement is: when signal quality of a primary cell PCell of the terminal is higher than s-measure, still performing the inter-RAT measurement of the terminal.

During the inter-RAT measurement of the terminal, if there is an NR cell in a neighboring cell, signal quality of the NR cell can be measured, so that reporting of a measurement report can be triggered when a condition is met.

In the implementation method 1 to the implementation method 4, the indication information is used to indicate ignoring s-measure during the neighboring cell measurement of the terminal. Specifically, the indication information is used to indicate that a measurement task associated with the indication information ignores s-measure during the neighboring cell measurement.

In the example described in the foregoing implementation method 1, the indication information is used to indicate that a measurement task corresponding to the measurement ID configuration 1 and the measurement task corresponding to measurement ID configuration 2 ignore s-measure during the neighboring cell measurement. For other measurement tasks, that is, for measurement tasks respectively corresponding to the measurement ID configuration 3 to the measurement ID configuration 6, s-measure cannot be ignored. In other words, when signal quality of a PCell measured by the terminal is higher than s-measure, the terminal stops performing neighboring cell measurement of these measurement tasks.

In the example described in the foregoing implementation method 2, the indication information is used to indicate that a measurement task corresponding to the measurement ID configuration 1 and the measurement task corresponding to measurement ID configuration 3 ignore s-measure during the neighboring cell measurement. For other measurement tasks, that is, for neighboring cell measurement of measurement tasks respectively corresponding to the measurement ID configuration 2, and the measurement ID configuration 4 to the measurement ID configuration 6, s-measure cannot be ignored. That is, when signal quality of a PCell measured by the terminal is higher than s-measure, the terminal stops performing neighboring cell measurement of these measurement tasks.

In the example described in the foregoing implementation method 3, the indication information is used to indicate that the measurement task corresponding to the measurement ID configuration 1 ignore s-measure during the neighboring cell measurement. For other measurement tasks, that is, for neighboring cell measurement of measurement tasks respectively corresponding to the measurement ID configuration 2 to the measurement ID configuration 6, s-measure cannot be ignored. That is, when signal quality of a PCell measured by the terminal is higher than s-measure, the terminal stops performing neighboring cell measurement of these measurement tasks.

For a specific method in which the indication information is used to indicate that s-measure cannot be ignored during the neighboring cell measurement of the measurement task, the foregoing methods of the implementation method 1 to the implementation method 3 may alternatively be used, and description by using an example is not performed again.

In another case, if it needs to indicate ignoring s-measure during neighboring cell measurement of a specific measurement task, a method similar to the foregoing implementation method 4 may be used, and description by using an example is not performed again.

In the foregoing embodiment, the performing the neighboring cell measurement based on the indication information may be: performing the neighboring cell measurement when the signal quality of the primary cell in which the base station provides a service to the terminal is higher than s-measure. Alternatively, the performing the neighboring cell measurement based on the indication information may be understood as: performing the neighboring cell measurement when the signal quality of the primary cell (PCell) of the terminal is higher than s-measure.

In a possible implementation, for a specific method for performing the neighboring cell measurement, refer to the prior art. Details are not described again.

During specific implementation, the specific method for performing the neighboring cell measurement may alternatively be: when the signal quality of the primary cell (PCell) of the terminal is higher than or equal to s-measure, performing the neighboring cell measurement.

In the foregoing step 201 to step 203, the indication information is carried in the measurement configuration, to indicate the relationship between the neighboring cell measurement of the terminal and configured s-measure of the terminal, so that the terminal may perform the neighboring cell measurement based on the indication information, thereby implementing flexible configuration of the measurement configuration.

Further, the indication information may indicate ignoring s-measure during the neighboring cell measurement of the terminal. For example, if the indication information indicates ignoring s-measure during the inter-RAT measurement of the terminal, when the signal quality of the primary cell in which the base station provides a service to the terminal is higher than s-measure, the terminal performs only a part of the neighboring cell measurement, that is, performs only the inter-RAT measurement and does not perform intra-RAT measurement (for example, including intra-frequency measurement and inter-frequency measurement), thereby achieving balance between UE power saving and UE performance.

In the foregoing implementation methods, based on consideration of power saving, the base station may receive a needed measurement report, to perform carrier management. For example, an NR cell is added as a secondary base station, thereby improving utilization of the NR cell, increasing a peak rate of a user, and improving user experience.

Optionally, the following steps are further included.

Step 204. The terminal generates a measurement report and sends the measurement report to the base station, and the base station receives the measurement report from the terminal.

When measurement of the terminal meets a condition for generating the measurement report, the measurement report is generated and sent to the base station. For a specific implementation process, refer to the prior art. Details are not described again.

For example, referring to FIG. 1, if an LTE base station indicates, by using the indication information of the measurement configuration, that the neighboring cell measurement of the terminal includes the inter-RAT measurement, after the base station receives the measurement report, and if the base station determines to add the NR cell as a serving cell of the terminal, EN-DC is successfully configured, that is, the terminal works with the LTE base station (a primary base station) and an NR base station (a secondary base station) at the same time. A primary cell in LTE is referred to as a primary cell (PCell) of the terminal, and a primary cell in an NR base station is referred to as a primary secondary cell (PSCell) of the terminal.

In an independent embodiment, after the NR base station is added as the secondary base station of the terminal, the primary base station and the secondary base station may separately transmit measurement configurations to the terminal to perform neighboring cell measurement, and the primary base station and the secondary base station may separately transmit s-measure. S-measure 1 transmitted by the primary base station is specific to the PCell, and s-measure 2 transmitted by the secondary base station is specific to the PSCell.

For the primary base station, if the signal quality of the PCell is higher than s-measure 1, the terminal does not perform the neighboring cell measurement corresponding to the measurement configuration transmitted by the primary base station. However, the measurement configuration transmitted by the secondary base station is not affected by s-measure 1, that is, the neighboring cell measurement corresponding to the measurement configuration transmitted by the secondary base station is still performed, unless the PSCell is higher than s-measure 2. In this way, s-measure transmitted by the primary base station and the secondary base station affects only the measurement configurations transmitted by the primary base station and the secondary base station, thereby simplifying system complexity.

Optionally, for the primary base station, when the measurement configuration sent by the primary base station includes the indication information, for a specific implementation process, refer to the method in the procedure shown in FIG. 2. To be specific, the base station in the procedure shown in FIG. 2 is the primary base station. For example, when the indication information is used to indicate ignoring s-measure 1 during the neighboring cell measurement of the terminal, that the terminal performs the neighboring cell measurement may be: when the signal quality of the primary cell (PCell) of the terminal is higher than s-measure 1, performing the neighboring cell measurement. For another example, when the indication information is used to indicate that s-measure 1 cannot be ignored during the neighboring cell measurement of the terminal, that the terminal performs the neighboring cell measurement may be: when the signal quality of the primary cell (PCell) of the terminal is higher than s-measure 1, stopping performing the neighboring cell measurement. For a specific method for carrying the indication information, refer to the foregoing description. Details are not described again.

For the secondary base station, if the (PSCell) is higher than s-measure 2, the terminal does not perform the neighboring cell measurement corresponding to the measurement configuration transmitted by the secondary base station. However, the measurement configuration transmitted by the primary base station is not affected by s-measure 2. To be specific, the neighboring cell measurement corresponding to the measurement configuration transmitted by the primary base station is still performed, unless the PCell is higher than s-measure 2.

Optionally, for the secondary base station, when the measurement configuration sent by the secondary base station includes the indication information, for a specific implementation process, refer to the method in the procedure shown in FIG. 2. To be specific, the base station in the procedure shown in FIG. 2 is the secondary base station. For example, when the indication information is used to indicate ignoring s-measure 2 during the neighboring cell measurement of the terminal, that the terminal performs the neighboring cell measurement may be: when the signal quality of the primary secondary cell (PSCell) of the terminal is higher than s-measure 2, performing the neighboring cell measurement. For another example, when the indication information is used to indicate that s-measure 2 cannot be ignored during the neighboring cell measurement of the terminal, that the terminal performs the neighboring cell measurement may be: when the signal quality of the primary secondary cell (PSCell) of the terminal is higher than s-measure 2, stopping performing the neighboring cell measurement. In addition, for a specific method for carrying the indication information, refer to the foregoing description. Details are not described again.

It should be noted that the measurement for the secondary base station is not affected by s-measure 1 configured by the primary base station, and the measurement for the primary base station is not affected by s-measure 2 configured by the secondary base station. It may also be noted that the measurement for the primary base station is affected only by s-measure 1 configured by the primary base station, and the measurement for the secondary base station is affected only by s-measure 2 configured by the secondary base station.

In LTE, s-measure can only be configured as a reference signal received power (RSRP) threshold. To be specific, an RSRP measurement value of the PCell is compared with s-measure.

In the foregoing embodiments of this application, s-measure may be configured as an RSRP threshold, or may be configured as a signal to interference plus noise ratio (SINR) threshold. To be specific, an s-measure configuration transmitted by the base station may indicate a configured value on one hand, and may further indicate a threshold type on the other hand, for example, indicate that s-measure is specific to an SINR measurement value.

Further, in a DC scenario, the primary base station and the secondary base station may configure different types of s-measure thresholds. For example, the primary base station configures s-measure of an RSRP type, and the secondary base station configures s-measure of an SINR type. Alternatively, the primary base station configures s-measure of an SINR type, and the secondary base station configures s-measure of an RSRP type.

Further, in the foregoing embodiments of this application, s-measure may also be a threshold that is configured by the base station and that is based on a measurement reference signal type, where the measurement reference signal type is a synchronization signal block (SS block) or a channel state information-reference signal (CSI-RS).

Therefore, when both the threshold type and the measurement reference signal type are considered, s-measure may be of the following types.

S-measure is an RSRP threshold that is based on SS block measurement, s-measure is an RSRP threshold that is based on CSI-RS measurement, s-measure is an SINR threshold that is based on SS block measurement, or s-measure is an SINR threshold that is based on CSI-RS measurement.

S-measure may be s-measure configured by the primary base station, or may be s-measure configured by the secondary base station.

Further, in the foregoing embodiments of this application, the indication information may alternatively be implemented by using a threshold. When the indication information is a reference threshold, the reference threshold is greater than s-measure.

The following separately describes the primary base station and the secondary base station. The primary base station configures s-measure 1 and a reference threshold 1, and the secondary base station configures s-measure 2 and a reference threshold 2.

For the primary base station, when the signal quality of the primary cell (PCell) of the terminal is higher than s-measure 1 and is lower than the reference threshold 1, the primary base station performs the neighboring cell measurement, and when the signal quality of the primary cell (PCell) of the terminal is higher than the reference threshold 1, the primary base station stops performing the neighboring cell measurement.

For the secondary base station, when the signal quality of the primary secondary cell (PSCell) of the terminal is higher than s-measure 2 and is lower than the reference threshold 2, the secondary base station performs the neighboring cell measurement, and when the signal quality of the primary secondary cell (PSCell) of the terminal is higher than the reference threshold 2, the secondary base station stops performing the neighboring cell measurement.

Further, in the foregoing embodiments of this application, the indication information may alternatively be implemented by using an offset value. When the indication information is an offset value, the offset value is greater than 0.

The following separately describes the primary base station and the secondary base station. The primary base station configures s-measure 1 and a first offset value, and the secondary base station configures s-measure 2 and a second offset value.

For the primary base station, when the signal quality of the primary cell (PCell) of the terminal is higher than s-measure 1 and is lower than a sum of s-measure 1 and the first offset value, the primary base station performs the neighboring cell measurement, and when the signal quality of the primary secondary cell (PSCell) of the terminal is higher than the sum of s-measure 1 and the first offset value, the primary base station stops performing the neighboring cell measurement, and For the secondary base station, when the signal quality of the primary secondary cell (PSCell) of the terminal is higher than s-measure 2 and is lower than a sum of s-measure 2 and the second offset value, the secondary base station performs the neighboring cell measurement, and when the signal quality of the primary secondary cell (PSCell) of the terminal is higher than the sum of s-measure 2 and the second offset value, the secondary base station stops performing the neighboring cell measurement.

Figure 3:
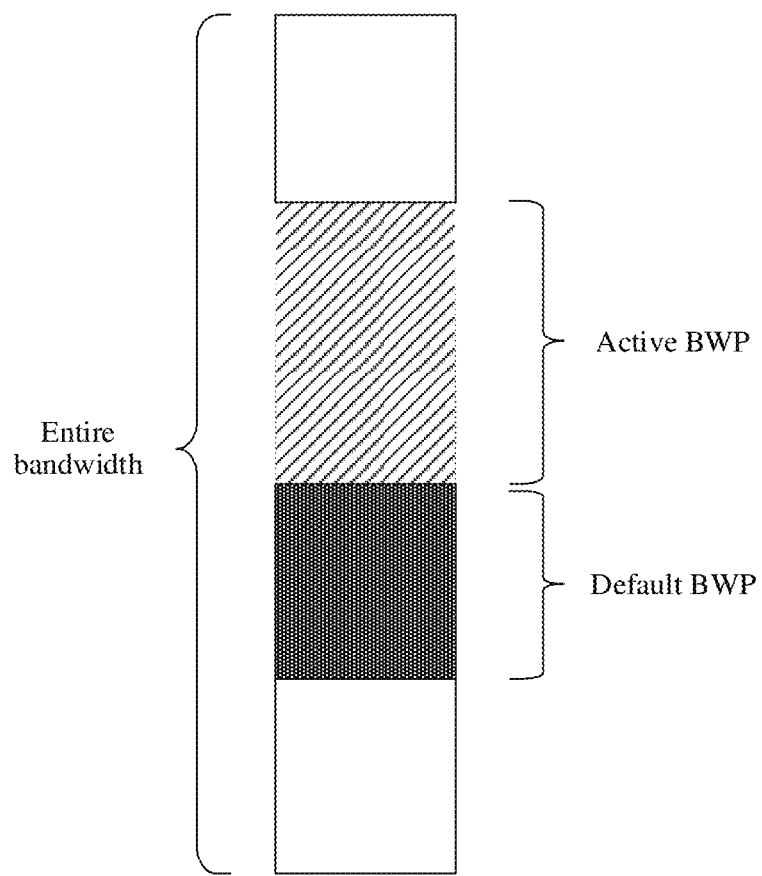
FIG. 3 is a schematic diagram of a part of bandwidth of a configured terminal according to an embodiment of this application.

In an independent embodiment, the NR cell may be a quite wide carrier. Due to a limitation of a terminal capability or the like, when the NR cell is a serving cell of the terminal, the terminal may work on only a part of bandwidth of the NR cell. Therefore, one or more active bandwidth parts BWPs (Bandwidth Part) may be configured for the terminal, and the active BWP of the terminal may be quickly switched to another frequency band by using physical layer signaling. A default BWP may also be configured for the terminal by a network, as shown in FIG. 3.

When measuring the NR cell, the terminal actually measures a reference signal, that is, an SS block and a CSI-RS. There may be a reference signal on some BWPs, and there may be no reference signal on some BWPs. When transmitting the measurement configuration, the network may send a configuration of the reference signal, including a frequency domain location, to the terminal, so that the terminal can learn whether a reference signal exists on a currently active BWP.

When there is a reference signal on an active BWP of the terminal, the terminal may measure the reference signal on the active BWP, and does not need to measure a reference signal outside the active BWP. When the active BWP is changed to another frequency band, the reference signal measured by the terminal is also changed to a new active BWP, and provided that there is a reference signal on one of a plurality of active BWPs of the terminal, in this case, only the reference signal on the active BWP needs to be measured, so that no measurement gap is needed when the terminal performs measurement on the NR cell, thereby reducing impact on data transmission. When there is no reference signal on the active BWP of the terminal, the terminal may measure the reference signal on the default BWP.

The solutions provided in this application are described above mainly from a perspective of interaction between network elements. It may be understood that, to implement the foregoing functions, the network elements include corresponding hardware structures and/or software modules for performing the foregoing functions. A person skilled in the art should be easily aware that, in combination with the examples described in the embodiments disclosed in this specification, units and algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 4:
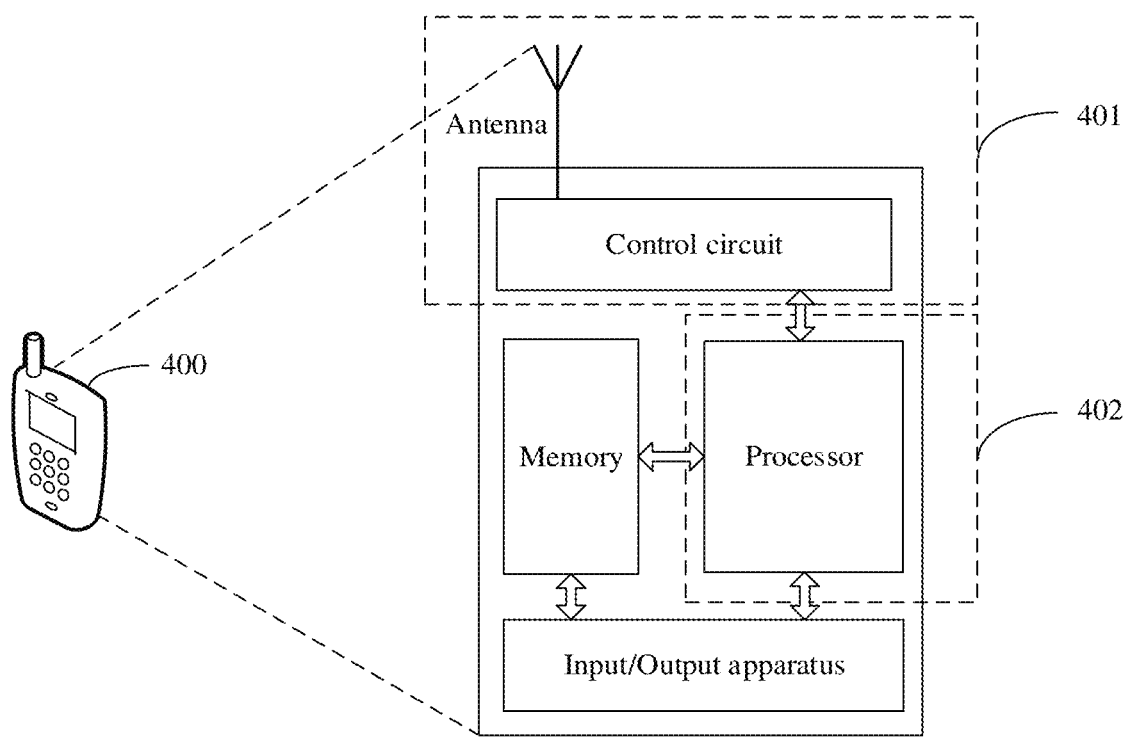
FIG. 4 is a schematic structural diagram of a terminal according to an embodiment of this application.

Based on a same inventive concept, an embodiment of this application further provides a terminal 400. FIG. 4 is a schematic structural diagram of the terminal. For ease of description, FIG. 4 shows only main components of the terminal. As shown in FIG. 4, the terminal 400 includes a processor, a memory, a control circuit, an antenna, and an input/output apparatus. The processor is mainly configured to: process a communications protocol and communication data, control the entire terminal, execute a software program, and process data of the software program, for example, configured to support the terminal in performing actions performed by the terminal in the foregoing embodiment. The memory is mainly configured to store software program and data. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The transceiver receives signaling sent by a base station. For details, refer to the description in the foregoing related part. The input/output apparatus such as a touchscreen, a display, or a keyboard, is mainly configured to: receive data input by a user, and output data to the user.

After the terminal is powered on, the processor may read the software program in a storage unit, interpret and execute an instruction of the software program, and process the data of the software program. When data needs to be sent wirelessly, the processor performs baseband processing on to-be-sent data, and then outputs a baseband signal to a radio frequency circuit. After performing radio frequency processing on the baseband signal, and the radio frequency circuit sends a radio frequency signal in an electromagnetic wave form by using the antenna. When data is sent to the terminal, the radio frequency circuit receives the radio frequency signal by using the antenna, converts the radio frequency signal into the baseband signal, and outputs the baseband signal to the processor. The processor converts the baseband signal into data, and processes the data.

A person skilled in the art may understand that for ease of description, FIG. 4 shows only one memory and only one processor. Actually, the terminal may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire terminal, execute the software program, and process the data of the software program. The processor in FIG. 4 integrates functions of the baseband processor and the central processing unit. A person skilled in the art may understand that the baseband processor and the central processing unit may be alternatively processors independent of each other, and are interconnected by using a technology such as a bus. A person skilled in the art may understand that the terminal may include a plurality of baseband processors to adapt to different network standards, and the terminal may include a plurality of central processing units to enhance a processing capability of the terminal. The components of the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a form of a software program, so that the processor executes the software program to implement a baseband processing function.

For example, in this embodiment of this application, the antenna and the control circuit that have a sending and receiving function may be considered as a transceiver unit 401 of the terminal 400, and the processor having a processing function may be considered as a processing unit 402 of the terminal 400. As shown in FIG. 4, the terminal 400 includes the transceiver unit 401 and the processing unit 402. The transceiver unit may also be referred to as a transceiver, a transceiver machine, a transceiver apparatus, or the like. Optionally, a component for implementing a receiving function in the transceiver unit 401 may be considered as a receiving unit, and a component for implementing a sending function in the transceiver unit 401 may be considered as a sending unit. In other words, the transceiver unit 401 includes the receiving unit and the sending unit. For example, the receiving unit may also be referred to as a receiver machine, a receiver, a receiver circuit, or the like, and the sending unit may be referred to as a transmitter machine, a transmitter, a transmit circuit, or the like.

Figure 5:
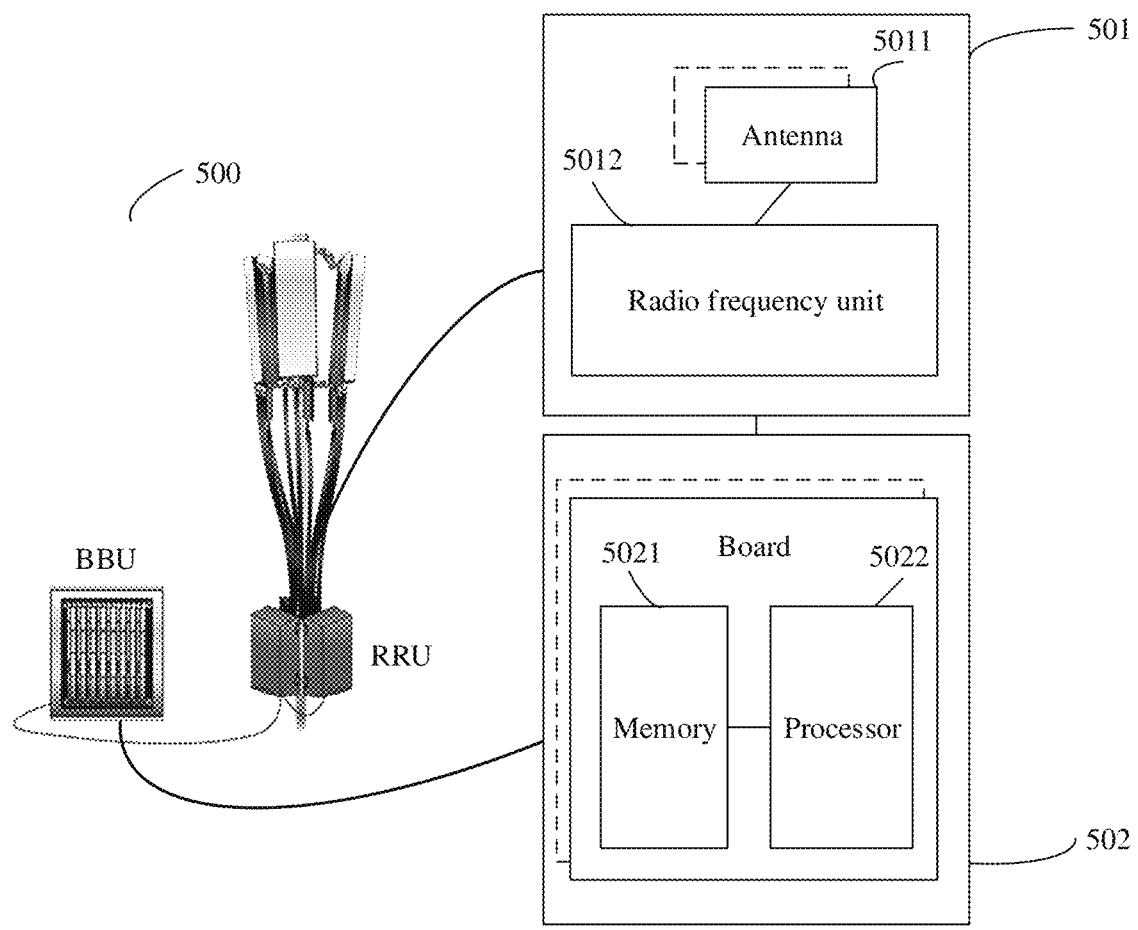
FIG. 5 is a schematic structural diagram of a base station according to an embodiment of this application.

Based on a same inventive concept, an embodiment of this application further provides a base station 500. FIG. 5 is a schematic structural diagram of the base station 500. The base station 500 may be configured to perform actions performed by the base station in the foregoing embodiment. The base station 500 includes one or more remote radio units (RRU) 501 and one or more baseband units (BBU) 502. The RRU 501 may be referred to as a transceiver unit, a transceiver machine, a transceiver circuit, a transceiver, or the like, and may include at least one antenna 5011 and a radio frequency unit 5012. The RRU 501 is mainly configured to send and receive a radio frequency signal and convert the radio frequency signal and a baseband signal. The BBU 502 is mainly configured to perform baseband processing, control the base station, and the like. The RRU 501 and the BBU 502 may be physically disposed together, or may be physically disposed separately, namely, in a distributed base station.

The BBU 502 is a control center of the base station, may also be referred to as a processing unit, and is mainly configured to implement a baseband processing function such as channel coding, multiplexing, modulation, or spreading. For example, the BBU (processing unit) may be configured to control the base station to perform some actions performed by the base station in the foregoing embodiment.

In an example, the BBU 502 may include one or more boards, and a plurality of boards may jointly support a radio access network of a single access standard, or may separately support radio access networks of different access standards. The BBU 502 further includes a memory 5021 and a processor 5022. The memory 5021 is configured to store a necessary instruction and necessary data. For example, the memory 5021 stores configuration information of a random access preamble in the foregoing embodiment. The processor 5022 is configured to control the base station to perform a necessary action, for example, configured to control the base station to perform the action performed by the base station in the foregoing embodiment. The memory 5021 and the processor 5022 may serve one or more boards. In other words, a memory and a processor may be independently disposed on each board. Alternatively, a plurality of boards may use a same memory and a same processor. In addition, a necessary circuit is further disposed on each board.

Figure 6:
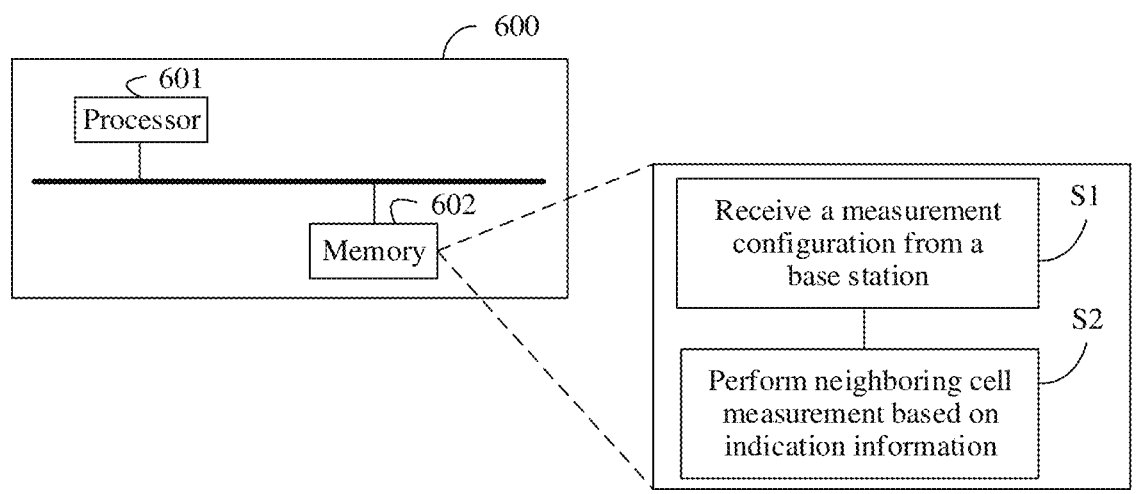
FIG. 6 is a schematic structural diagram of an apparatus according to an embodiment of this application.

Based on a same inventive concept, an embodiment of this application further provides an apparatus. The apparatus may be a terminal, or may be a chip in a terminal. As shown in FIG. 6, the apparatus includes a processor 601 and a memory 602.

The memory 602 is configured to store a computer-executable instruction, and the processor 601 is configured to execute the computer-executable instruction stored in the memory 602.

The processor 601 executes the computer-executable instruction stored in the memory 602, or the processor 601 controls the transceiver to execute the computer-executable instruction stored in the memory 602, so that the apparatus 600 performs the steps performed by the terminal in the measurement method provided in the foregoing embodiment, or the terminal deploys functional units corresponding to the steps. For example, the memory 602 includes the following instructions.

Instruction S1: Receive a measurement configuration from a base station, where the measurement configuration includes indication information, and the indication information is used to indicate a relationship between neighboring cell measurement of a terminal and configured s-measure of the terminal.

Instruction S2: Perform the neighboring cell measurement based on the indication information.

The processor 601 may include different types of processors 601 or a same type of processor 601. The processor 601 may be any one of the following components with a computing processing capability: a central processing unit (CPU for short), an ARM processor, a field programmable gate array (FPGA for short), a dedicated processor, and the like. In an optional implementation, the processor 601 may alternatively be integrated as a many-core processor.

The memory 602 may be any one or any combination of the following storage media: a random access memory (RAM for short), a read-only memory (ROM for short), a nonvolatile memory (NVM for short), a solid-state drive (SSD for short), a mechanical hard disk, a magnetic disk, a disk array, and the like.

Figure 7:
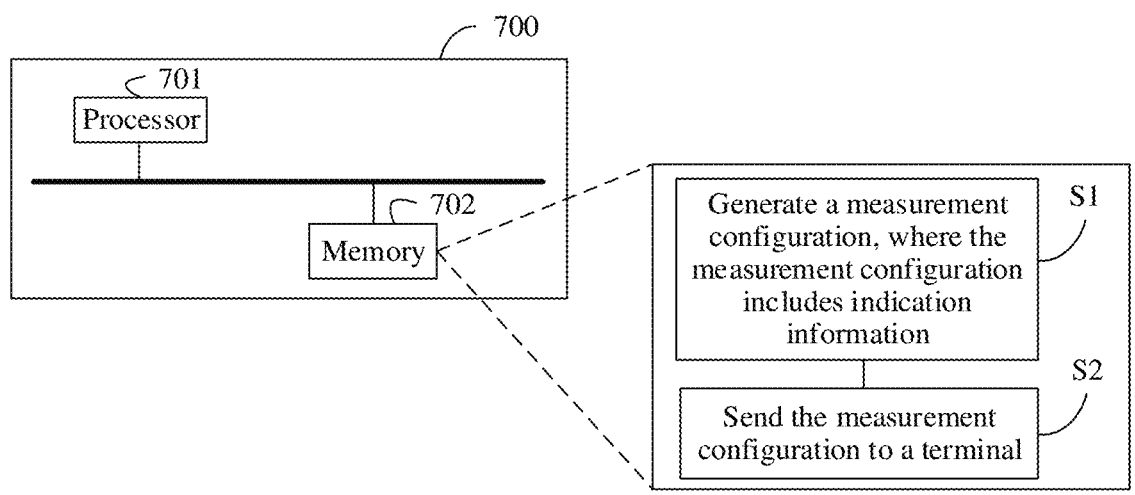
FIG. 7 is a schematic structural diagram of an apparatus according to an embodiment of this application.

Based on a same inventive concept, an embodiment of this application further provides an apparatus. The apparatus may be a base station, or may be a chip in a base station. As shown in FIG. 7, the apparatus includes at least a processor 701 and a memory 702. The memory 702 is configured to store a computer-executable instruction, and the processor 701 is configured to execute the computer-executable instruction stored in the memory 702.

The processor 701 executes the computer-executable instruction stored in the memory 702, or the processor 701 controls a transceiver to execute the computer-executable instruction stored in the memory 702, so that the apparatus 700 performs the steps performed by the base station in the measurement method provided in the foregoing embodiment, or the base station deploys functional units corresponding to the steps. For example, the memory 702 includes the following instructions.

Instruction S1: Generate measurement configuration, where the measurement configuration includes indication information, and the indication information is used to indicate a relationship between neighboring cell measurement of a terminal and configured s-measure of the terminal.

Instruction S2: Send the measurement configuration to the terminal.

The processor 701 may include different types of processors 701 or a same type of processor 701. The processor 701 may be any one of the following components with a computing processing capability—a central processing unit (CPU for short), an ARM processor, a field programmable gate array (FPGA for short), a dedicated processor, and the like. In an optional implementation, the processor 701 may alternatively be integrated as a many-core processor.

The memory 702 may be any one or any combination of the following storage media: a random access memory (RAM for short), a read-only memory (read only memory, ROM for short), a nonvolatile memory (non-volatile memory, NVM for short), a solid state drive (SSD for short), a mechanical hard disk, a magnetic disk, a disk array, and the like.

Figure 8:
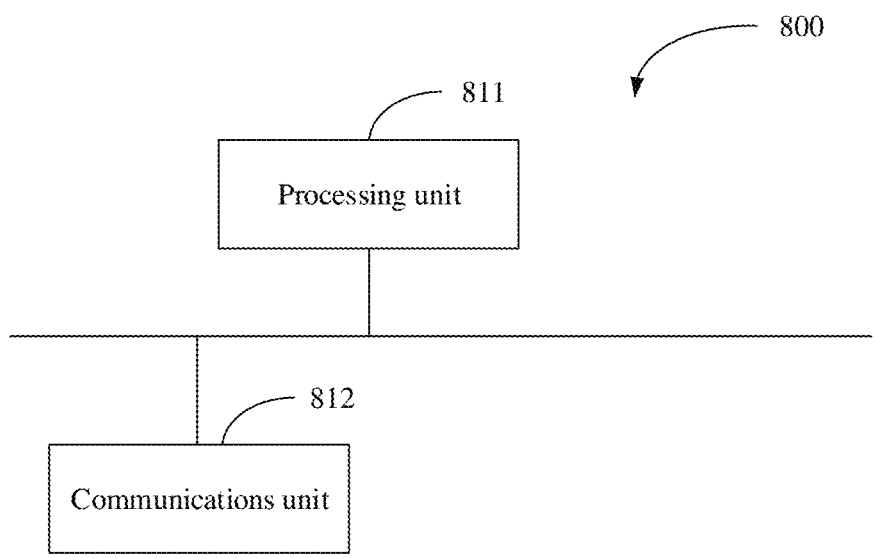
FIG. 8 is a schematic structural diagram of an apparatus according to an embodiment of this application.

FIG. 8 is a schematic diagram of an apparatus according to this application. The apparatus 800 may be the terminal or the chip in the terminal in any one of the foregoing embodiments.

The apparatus 800 may be configured to perform any one of the foregoing measurement methods. The apparatus 800 includes at least one processing unit 811 and a communications unit 812. The processing unit 811 and the communications unit 812 are connected by using a communications bus. The communications bus may include a path for transmitting information between the foregoing units.

The processing unit 811 may be a general-purpose central processing unit (CPU), a microprocessor, an application-specific integrated circuit (ASIC), or one or more integrated circuits configured to control program execution in the solutions of the present disclosure.

The communications unit 812 may be an apparatus with a sending and receiving function, and is configured to communicate with another device or a communications network, for example, the Ethernet, a radio access network (RAN), or a wireless local area network (WLAN).

In a possible design, when the apparatus is a terminal, the processing unit 811 may be, for example, a processor, the communications unit 812 may be, for example, a transceiver, and the transceiver includes a radio frequency circuit. When the apparatus further includes a storage unit, the storage unit is configured to store a computer-executable instruction, the processing unit 811 is connected to the storage unit, and the processing unit 811 executes the computer-executable instruction stored in the storage unit, so that the terminal performs the measurement method in any one of the foregoing embodiments.

In another possible design, when the apparatus is a chip in a terminal, the processing unit 811 may be, for example, a processor, and the communications unit 812 may be, for example, an input/output interface, a pin, or a circuit. The processing unit 811 may execute a computer-executable instruction stored in a storage unit, so that any measurement method in the foregoing embodiments is performed. Optionally, the storage unit is a storage unit in the chip, for example, a register or a buffer, and the storage unit may alternatively be a storage unit that is in the terminal and that is outside the chip, for example, a ROM, another type of static storage device that can store static information and an instruction, or a RAM.

That the chip performs the measurement method may be understood as that the chip implements the measurement method in combination with another component in the apparatus.

The communications unit 812 is configured to receive a measurement configuration from a base station, where the measurement configuration includes indication information, and the indication information is used to indicate a relationship between neighboring cell measurement of a terminal and configured s-measure of the terminal.

The processing unit 811 is configured to perform the neighboring cell measurement based on the indication information.

In an implementation, that the indication information is used to indicate a relationship between neighboring cell measurement of a terminal and configured s-measure of a terminal includes: the indication information indicates ignoring s-measure during the neighboring cell measurement of the terminal; and the processing unit 811 is configured to: perform the neighboring cell measurement when signal quality of a primary cell in which the base station provides a service to the terminal is higher than s-measure, where the base station includes a primary base station or a secondary base station.

In an implementation, that the indication information indicates ignoring s-measure during the neighboring cell measurement of the terminal includes: the indication information indicates ignoring s-measure during inter-RAT radio access technology inter-RAT measurement of the terminal; and the processing unit 811 is configured to: perform the inter-RAT measurement of the terminal when the signal quality of the primary cell that is in by the base station and that provides a service to the terminal is higher than s-measure.

In an implementation, the measurement configuration carries a report configuration, the report configuration carries the indication information, and the indication information is used to indicate ignoring s-measure during neighboring cell measurement of a measurement task associated with the report configuration; or the measurement configuration carries a measurement object configuration, the measurement object configuration carries the indication information, and the indication information is used to indicate ignoring s-measure during neighboring cell measurement of a measurement task associated with the measurement object configuration; or the measurement configuration carries a measurement identification (ID) configuration, the measurement ID configuration carries the indication information, and the indication information is used to indicate ignoring s-measure during neighboring cell measurement of a measurement task associated with the measurement ID configuration.

In an implementation, that the indication information is used to indicate a relationship between neighboring cell measurement of a terminal and configured s-measure of a terminal includes:

the indication information indicates that s-measure cannot be ignored during the neighboring cell measurement of the terminal; and the processing unit 811 is configured to: stop performing the neighboring cell measurement when the signal quality of the primary cell in which the base station provides a service to the terminal is higher than s-measure, where the base station includes a primary base station or a secondary base station.

In an implementation, s-measure is a reference signal received power (RSRP) threshold to a signal or interference plus noise ratio (SINR) threshold configured by the base station.

In an implementation, s-measure is an RSRP threshold that is based on synchronization signal block SS block measurement; or s-measure is an RSRP threshold that is based on channel state information-reference signal CSI-RS measurement; or s-measure is an SINR threshold that is based on SS block measurement; or s-measure is an SINR threshold that is based on CSI-RS measurement.

In an implementation, the indication information is a reference threshold, and the reference threshold is greater than s-measure; and the processing unit 811 is specifically configured to: perform the neighboring cell measurement when the signal quality of the primary cell in which the base station provides a service to the terminal is higher than s-measure and is lower than the reference threshold; or stop performing the neighboring cell measurement when the signal quality of the primary cell in which the base station provides a service to the terminal is higher than the reference threshold, where the base station includes the primary base station or the secondary base station.

In an implementation, the indication information is an offset value, and the offset value is greater than 0; and the processing unit 811 is specifically configured to: perform the neighboring cell measurement when the signal quality of the primary cell in which the base station provides a service to the terminal is higher than s-measure and is lower than a sum of s-measure and the offset value; or stop performing the neighboring cell measurement when the signal quality of the primary cell in which the base station provides a service to the terminal is higher than the sum of s-measure and the offset value, where the base station includes the primary base station or the secondary base station.

In an implementation, the base station is the primary base station of the terminal, the indication information is used to indicate a relationship, configured by the primary base station, between the neighboring cell measurement of the terminal and configured s-measure of the terminal, and s-measure is sent by the primary base station of the terminal to the terminal; or the base station is the secondary base station of the terminal, the indication information is used to indicate a relationship, configured by the secondary base station, between the neighboring cell measurement of the terminal and configured s-measure of the terminal, and s-measure is sent by the secondary base station of the terminal to the terminal.

It should be understood that, the terminal or the chip of the terminal may be configured to implement steps performed by the terminal in the measurement method in the embodiments of the present invention. For related features, refer to the foregoing description. Details are not described herein again.

Figure 9:
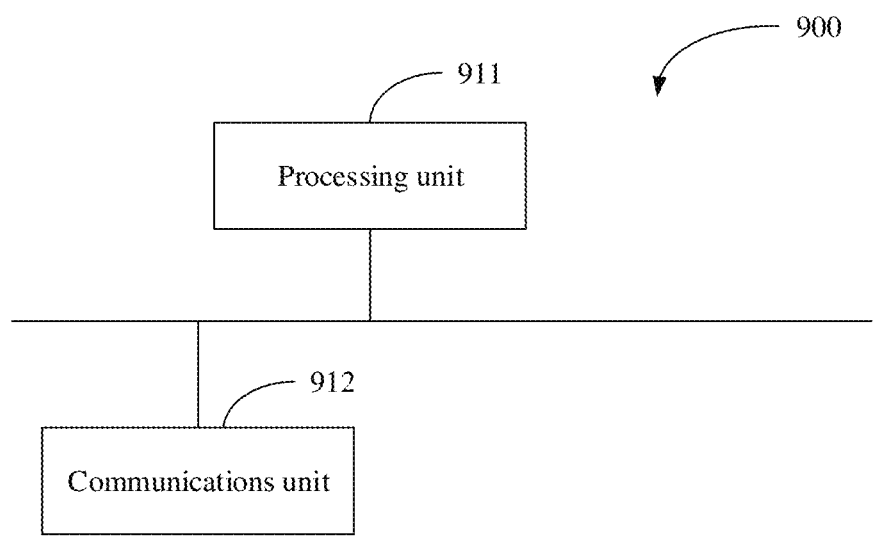
FIG. 9 is a schematic structural diagram of an apparatus according to an embodiment of this application.

FIG. 9 is a schematic diagram of an apparatus according to this application. The apparatus 900 may be the base station or the chip in the base station in any one of the foregoing embodiments.

The apparatus 900 may be configured to perform any one of the foregoing measurement methods. The apparatus 900 includes at least one processing unit 911 and a communications unit 912. The processing unit 911 and the communications unit 912 are connected by using a communications bus. The communications bus may include a path for transmitting information between the foregoing units.

The processing unit 911 may be a general-purpose central processing unit (CPU), a microprocessor, an application-specific integrated circuit (ASIC), or one or more integrated circuits configured to control program execution in the solutions of the present invention.

The communications unit 912 may be an apparatus with a sending and receiving function, and is configured to communicate with another device or a communications network, for example, the Ethernet, a radio access network (RAN), or a wireless local area network (WLAN).

In a possible design, when the apparatus is a base station, the processing unit 911 may be, for example, a processor, the communications unit 912 may be, for example, a transceiver, and the transceiver includes a radio frequency circuit. When the apparatus further includes a storage unit, the storage unit is configured to store a computer-executable instruction, the processing unit 911 is connected to the storage unit, and the processing unit 911 executes the computer-executable instruction stored in the storage unit, so that the base station performs the measurement method in any one of the foregoing embodiments.

In another possible design, when the apparatus is a chip in a base station, the processing unit 911 may be, for example, a processor, and the communications unit 912 may be, for example, an input/output interface, a pin, or a circuit. The processing unit 911 may execute a computer-executable instruction stored in a storage unit, so that any measurement method in the foregoing embodiments is performed. Optionally, the storage unit is a storage unit in the chip, for example, a register or a buffer, and the storage unit may alternatively be a storage unit that is in the base station and that is outside the chip, for example, a ROM, another type of static storage device that can store static information and an instruction, or a RAM.

That the chip performs the measurement method may be understood as that the chip implements the measurement method in combination with another component in the apparatus.

For example, when the apparatus is divided in the method shown in FIG. 9, the processing unit cooperates with the communications unit, so that the apparatus can implement the measurement method in any of the foregoing embodiments of this application.

The processing unit 911 is configured to generate a measurement configuration, where the measurement configuration includes indication information, and the indication information is used to indicate a relationship between neighboring cell measurement of a terminal and configured s-measure of the terminal; and the communications unit 912 is configured to send the measurement configuration to the terminal.

In an implementation, that the indication information is used to indicate a relationship between neighboring cell measurement of a terminal and configured s-measure of a terminal includes: the indication information indicates ignoring s-measure during the neighboring cell measurement of the terminal.

In an implementation, that the indication information indicates ignoring s-measure during the neighboring cell measurement of the terminal includes: the indication information indicates ignoring s-measure during inter-RAT measurement of the terminal.

In an implementation, the measurement configuration carries a report configuration, the report configuration carries the indication information, and the indication information is used to indicate ignoring s-measure during neighboring cell measurement of a measurement task associated with the report configuration; or the measurement configuration carries a measurement object configuration, the measurement object configuration carries the indication information, and the indication information is used to indicate ignoring s-measure during neighboring cell measurement of a measurement task associated with the measurement object configuration; or the measurement configuration carries a measurement identification ID configuration, the measurement ID configuration carries the indication information, and the indication information is used to indicate ignoring s-measure during neighboring cell measurement of a measurement task associated with the measurement ID configuration.

In an implementation, that the indication information is used to indicate a relationship between neighboring cell measurement of a terminal and configured s-measure of a terminal includes: the indication information indicates that s-measure cannot be ignored during the neighboring cell measurement of the terminal.

In an implementation, s-measure is a reference signal received power (RSRP) threshold or a signal to interference plus noise ratio (SINR) threshold configured by a base station.

In an implementation, s-measure is an RSRP threshold that is based on synchronization signal block SS block measurement; or s-measure is an RSRP threshold measured that is channel state information-reference signal CSI-RS measurement; or s-measure is an SINR threshold that is based on SS block measurement; or s-measure is an SINR threshold that is based on CSI-RS measurement.

In an implementation, the indication information is used to indicate a relationship, configured by a primary base station, between the neighboring cell measurement of the terminal and configured s-measure of the terminal; or the indication information is used to indicate a relationship, configured by a secondary base station, between the neighboring cell measurement of the terminal and configured s-measure of the terminal.

It should be understood that, the base station or the chip of the base station may be configured to implement steps performed by the terminal in the measurement method in the embodiments of the present invention. For related features, refer to the foregoing description. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer-readable storage medium, or a computer program product. Therefore, this application may use a form of hardware only embodiments, software only embodiments, or embodiments with a combination of software and hardware. They are collectively referred to as "modules" or "systems".

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, clearly, various modifications and combinations may be made to them without departing from the scope of the present invention. Correspondingly, the specification and accompanying drawings are merely example description of the present invention defined by the appended claims, and are considered as any of or all modifications, variations, combinations or equivalents that cover the scope of the present invention. Clearly, a person skilled in the art can make various modifications and variations to the present invention without departing from the spirit and scope of the present invention. In this way, the present invention is intended to cover these modifications and variations provided that they fall within the scope of protection defined by the following claims and their equivalent technologies.

What is claimed is:

1. A method, comprising:
   receiving a first quality threshold from a primary base station for signal quality measurement of a first cell in the primary base station or a second quality threshold from a secondary base station for signal quality measurement of a second cell in the secondary base station;
   performing first neighboring cell measurement according to a first measurement configuration from the primary base station based on signal quality of the first cell and the first quality threshold, regardless whether signal quality of the second cell exceeds the second quality threshold; and
   performing second neighboring cell measurement according to a second measurement configuration from the secondary base station based on the signal quality of the second cell and the second quality threshold, regardless whether the signal quality of the first cell exceeds the first quality threshold.

2. The method according to claim 1, wherein the first cell is a primary cell (Pcell) and the second cell is a primary secondary cell (PScell), and wherein:
   when the signal quality of the Pcell is higher than the first quality threshold, performing the first neighboring cell measurement according to the first measurement configuration from the primary base station is not required; and
   when the signal quality of the PScell is higher than the second quality threshold, performing the second neighboring cell measurement according to the second measurement configuration from the secondary base station is not required.

3. The method according to claim 1, wherein the first quality threshold is s-measure 1, and the second quality threshold is s-measure 2.

4. The method according to claim 1, wherein the first quality threshold or the second quality threshold is a threshold corresponding to a measurement reference signal, and the measurement reference signal comprises a synchronization signal block or a channel state information-reference signal.

5. The method according to claim 4, wherein the threshold corresponding to the measurement reference signal is a reference signal received power (RSRP) threshold of the measurement reference signal.

6. The method according to claim 1, wherein the primary base station belongs to a NR system.

7. An apparatus, comprising:
   a non-transitory memory storage comprising instructions; and
   one or more processors in communication with the memory storage, wherein the one or more processors execute the instructions to:
   receive a first quality threshold from a primary base station for signal quality measurement of a first cell in the primary base station or a second quality threshold from a secondary base station for signal quality measurement of a second cell in the secondary base station;

perform first neighboring cell measurement according to a first measurement configuration from the primary base station based on signal quality of the first cell and first quality threshold, regardless whether signal quality of the second cell exceeds the second quality threshold; and perform second neighboring cell measurement according to a second measurement configuration from the secondary base station based on the signal quality of the second cell and the second quality threshold, regardless whether the signal quality of the first cell exceeds the first quality threshold.

8. The apparatus according to claim 7, wherein the first cell is a primary cell (Pcell) and the second cell is a primary secondary cell (PScell), and wherein:

when the signal quality of the Pcell is higher than the first quality threshold, performing the first neighboring cell measurement according to the first measurement configuration from the primary base station is not required; and when the signal quality of the PScell is higher than the second quality threshold, performing the second neighboring cell measurement according to the second measurement configuration from the secondary base station is not required.

9. The apparatus according to claim 7, wherein the first quality threshold is s-measure 1, and the second quality threshold is s-measure 2.

10. The apparatus according to claim 7, the first quality threshold or the second quality threshold is a threshold corresponding to a measurement reference signal, and wherein the measurement reference signal comprises a synchronization signal block or a channel state information-reference signal.

11. The apparatus according to claim 10, wherein the threshold corresponding to the measurement reference signal is a reference signal received power (RSRP) threshold of the measurement reference signal.

12. The apparatus according to claim 7, wherein the primary base station belongs to a NR system.

13. A communications system, comprising:

a primary base station configured to independently configure a first quality threshold for signal quality measurement of a first cell in the primary base station and transmit the first quality threshold;

a secondary base station configured to independently configure a second quality threshold for signal quality measurement of a second cell in the secondary base station and transmit the second quality threshold; and a terminal configured to receive the first quality threshold from the primary base station and receive the second quality threshold from the secondary base station, perform first neighboring cell measurement according to a first measurement configuration from the primary base station based on signal quality of the first cell and the first quality threshold, regardless whether signal quality of the second cell exceeds the second quality threshold, and perform second neighboring cell measurement according to a second measurement configuration from the secondary base station based on the signal quality of the second cell and the second quality threshold, regardless whether the signal quality of the first cell exceeds the first quality threshold.

14. The communications system according to claim 13, wherein the first quality threshold is s-measure 1, and the second quality threshold is s-measure 2.

15. The communications system according to claim 13, wherein the first quality threshold or the second quality threshold is a threshold corresponding to a measurement reference signal, and wherein the measurement reference signal comprises a synchronization signal block or a channel state information-reference signal.

16. The communications system according to claim 15, wherein the threshold corresponding to the measurement reference signal is a reference signal received power (RSRP) threshold of the measurement reference signal.

17. The communications system according to claim 13, wherein the terminal is configured to receive the first measurement configuration from the primary base station and the second measurement configuration from the secondary base station.

18. The communications system according to claim 13, wherein the first cell is a primary cell (Pcell) and the second cell is a primary secondary cell (PScell), and:

when the signal quality of the Pcell is higher than the first quality threshold, performing the first neighboring cell measurement according to the first measurement configuration from the primary base station is not required; and when the signal quality of the PScell is higher than the second quality threshold, performing the second neighboring cell measurement according to the second measurement configuration from the secondary base station is not required.

19. The communications system according to claim 13, wherein the primary base station belongs to a NR system.

20. The communications system according to claim 19, wherein the secondary base station belongs to a NR system.

* * * * *